United States Patent [19]
Khalid et al.

[11] Patent Number: 5,206,869
[45] Date of Patent: * Apr. 27, 1993

[54] METHOD AND DEVICE FOR GENERATING HIGH QUALITY LASER BEAM FROM LASER DIODES

[75] Inventors: Najeeb A. Khalid, Montreal; Carl Diehl, Dollard-Des-Ormeaux; Stan Schwartz, Montreal, all of Canada

[73] Assignee: Escher-Grad Incorporated, Montreal, Canada

[*] Notice: The portion of the term of this patent subsequent to Jan. 28, 2009 has been disclaimed.

[21] Appl. No.: 785,478

[22] Filed: Oct. 31, 1991

Related U.S. Application Data

[63] Continuation of Ser. No. 670,883, Mar. 18, 1991.

[51] Int. Cl.[5] .............................................. H01S 3/10
[52] U.S. Cl. ..................................... 372/24; 372/101; 372/64; 372/36; 372/26
[58] Field of Search ...................... 372/24, 65, 101, 99, 372/107, 108, 64, 36, 26

[56] References Cited

U.S. PATENT DOCUMENTS

| | | | |
|---|---|---|---|
| 4,719,474 | 1/1988 | Hansen et al. | 346/108 |
| 5,084,883 | 1/1992 | Khalid et al. | 372/24 |

*Primary Examiner*—Léon Scott, Jr.
*Attorney, Agent, or Firm*—Foley & Lardner

[57] ABSTRACT

A method and device for generating a collimated laser beam which is circular in cross-section, non-astigmatic, diffraction-limited and has a gaussian energy distribution are disclosed. The device comprises a single mode optical waveguide having an input end and an output end, a laser diode optically coupled to the input end of the optical waveguide for producing at the output end thereof a laser beam which is circular in cross-section, non-astigmatic and diffraction-limited and has a gaussian energy distribution, and a collimating lens for collimating the laser beam. The collimating lens is disposed in spaced relationship to the output end of the optical waveguide such that the output end is positioned at the focal point of the collimating lens.

8 Claims, 5 Drawing Sheets

METHOD AND DEVICE FOR GENERATING HIGH QUALITY LASER BEAM FROM LASER DIODES

This application is a continuation of application Ser. No. 07/670,883, filed Mar. 18, 1991.

BACKGROUND OF THE INVENTION

The present invention relates to improvements in the field of laser imaging. More particularly, the invention is concerned with an improved laser scanning system for use in laser imaging.

Laser imaging apparatuses are well known in the art. These apparatuses are capable of producing on a photosensitive material two-dimensional images having resolutions of up to about 8,000 dots per inch. One type of such apparatuses generally includes a laser scanning system for scanning a laser beam across a film which is moved by a film transport mechanism. The laser scanning system typically comprises a laser source for generating a laser beam containing input information, a scan lens and a rotating mirror for reflecting the laser beam through the scan lens to produce a scanning beam with a constant linear velocity. The scan lens acts on the scanning beam to provide a focused beam spot that moves in a linear direction across the film, thereby providing a first dimension of the two-dimensional image on the film. Concurrently or alternately with the movement of the scanning beam, the film transport mechanism moves the film either continuously or in discrete steps to provide the other dimension of the desired two-dimensional image.

In order to provide a focused beam spot moving in a linear direction across the film, the laser beam, mirror and scan lens must be precisely aligned with each other. Thus, replacement of any component of the scanning system necessitates re-alignment. Although many different arrangements have been used to scan a laser beam across a material, none so far provide the lack of need for realignment. For example, in the laser scanning system described in U.S. Pat. No. 4,719,474, involving a rotatable prism having two mirror facets, there is still one degree of freedom adjustment which is necessary.

Conventional laser sources for high quality laser scanners, i.e. scanners that produce diffraction-limited beam spots, generally use gas lasers, such as helium-neon lasers. These lasers have low MTBF, require air or gas cooling and cannot be modulated without expensive acousto-optic modulators, which usually have a low band width. Laser diodes, on the other hand, can be readily modulated, but they display very poor beam quality since the beam emitted from a laser diode is elliptical in cross-section and astigmatic, and contains residual optical noise caused by internal reflections, resulting in distortion in temporal and spatial domains. Therefore, laser diodes cannot be used for high quality imaging which requires a laser beam which is circular in cross-section, non-astigmatic and diffraction-limited and has a gaussian energy distribution.

SUMMARY OF THE INVENTION

It is therefore an object of the present invention to overcome the above drawbacks and to provide an improved laser scanning system in which any of its components may be replaced without any need for re-alignment.

It is another object of the invention to modify in a simple and inexpensive manner the laser beam emitted from a laser diode so as to produce a laser beam which is circular in cross-section, non-astigmatic and diffraction-limited and has a gaussian energy distribution, thus rendering laser diodes usable for high quality imaging.

According to one aspect of the invention, there is provided a laser scanning system for scanning a laser beam across a material, comprising laser source means for generating a laser beam travelling along a first optical path; beam reflecting means in the path of the laser beam, the beam reflecting means being rotatable about a rotation axis and including a single mirror facet which extends in a plane oriented at an angle of 45° relative to the rotation axis an has a center of rotation lying on the rotation axis, for reflecting the laser beam into a scanning beam travelling along a second optical path orthogonal to the first optical path and moving at a substantially constant angular velocity; and scan lens means in the path of the scanning beam for focusing the scanning beam onto the material and providing a focused beam spot moving repeatedly in a linear direction across the material. The laser scanning system of the invention further includes a support means for supporting the laser source means, the beam reflecting means and the scan lens means relative to one another. The support means has a unitary body formed with a first bore extending through the body so as to define first and second opposed openings for receiving the laser source means and the beam reflecting means, respectively, and enabling same to be mounted to the body such that the laser beam is aligned with the rotation axis. A second bore extends at least partially through the body and intersects the first bore orthogonally so as to define a third opening for receiving the scan lens means and enabling same to be mounted to the body such that the center of rotation of the mirror facet is aligned with a center point of the scan lens means. Thus, positioning the laser source means, the beam reflecting means and the scan lens means in the first, second and third openings, respectively, causes alignment of the laser beam with the rotation axis and of the center of rotation with the center point.

Applicant has found quite unexpectedly that the mountings for both the laser source means and the beam reflecting means can be easily machined with high accuracy by providing a through-bore in a unitary body, whereby the laser beam is aligned with the rotation axis of the beam reflecting means. On the other hand, alignment of the center of rotation of the mirror facet with the center point of the scan lens means is achieved by machining in the same body a scan lens mounting hole which intersects the through-bore orthogonally. As the accurary of machining determines the accuracy of the orthogonality and the mounting holes for the three components, and because such tolerances are within the acceptable range for high accuracy laser scanning systems, there is no need for optically aligning the laser beam, the beam reflecting means and the scan lens means.

Applicant has also found quite unexpectedly that the laser beam emitted from a laser diode can be modified in a simple and inexpensive manner by optically coupling the laser diode to the input end of a single mode optical waveguide so as to produce at the output end of such a waveguide a laser beam which is circular in crosssection, non-astigmatic and diffraction-limited and has a gaussian energy distribution.

The present invention therefore provides, in another aspect thereof, a method of generating a laser beam which is circular in cross-section, non-astigmatic, diffraction-limited and has a gaussian energy distribution, which comprises providing a single mode optical waveguide having an input end and an output end, optically coupling a laser diode to the input end of the optical waveguide and energizing the laser diode to produce the desired laser beam at the output end of the optical waveguide.

A single mode optical waveguide optically coupled to a laser diode thus acts as a spatial filter by removing astigmatism as well as retroreflections and thus flare, thereby providing a beam which is non-astigmatic and diffraction-limited. It also acts as a temporal filter thus reducing optical noise. In addition, the laser beam thus produced has a gaussian energy distribution and an aspect ratio of 1:1 between tangential and sagital angles $\theta_\perp$ and $\theta_{//}$ of the beam, that is, the beam is circular in cross-section.

Where the laser scanning system of the invention is used in laser imaging, the laser source means therefore preferably comprise a single mode optical waveguide having an input end and an output end, a laser diode optically coupled to the input end of the optical waveguide for producing at the output end thereof a laser beam which is circular in cross-section, non-astigmatic and diffraction-limited and has a gaussian energy distribution, a collimating lens for collimating the laser beam, the collimating lens having a focal point and being disposed in the path of the laser beam with the output end of the optical waveguide positioned at the focal point, and laser drive means electrically connected to the laser diode for modulating the laser beam in response to an electrical signal representative of the desired image. The scan lens means, on the other hand, comprises a flat field scan lens, also known as a F-$\theta$ lens, for maintaining a constant image spot size over the scan width and for correcting any image height error.

Use is preferably made of a red laser diode for high quality high resolution imaging. Red laser diodes provide a sharper and finer image spot than infra-red laser diodes. They also offer the advantages of other laser diodes, i.e. long life, lower power consumption and lower costs.

In a particularly preferred embodiment of the invention, the collimating lens used is constructed and arranged to provide a collimated laser beam having a diameter such as to overfill the single mirror facet of the beam reflecting means. This ensures that the single mirror facet will truncate the laser beam at the maximum slope of its gaussian energy distribution.

According to another preferred embodiment, the beam reflecting means comprises a cylindrical member having a central longitudinal axis coaxial with the rotation axis, the cylindrical member being truncated at an angle of 45° relative to its central longitudinal axis to define the aforementioned mirror facet. Such a truncated cylindrical member preferably has on a side thereof a cavity for providing a substantially uniform mass distribution about its central longitudinal axis. The truncated cylindrical member is advantageously mounted to a flywheel which is rotatably driven by motor means for rotating the truncated cylindrical member about its longitudinal axis, the flywheel being provided with a plurality of circumferentially spaced-apart balancing screws for removing any mass imbalance of the cylindrical member and the flywheel.

According to yet another preferred embodiment, the laser source means, beam reflecting means and scan lens means are each mounted to the body of the support means in a gas tight manner. The body is preferably provided with a conduit in gas flow communication with the first and second bores, for introducing a gas under pressure and maintaining a positive pressure inside the body. This ensures that any lubricant particles from the motor means will not enter the body and contaminate the mirror and/or scan lens.

The laser scanning system of the invention can be used not only in laser imaging, but also in non-imaging applications, such as scanning documents or products for reading information thereon or for detecting defects in materials.

BRIEF DESCRIPTION OF THE DRAWINGS

Further features and advantages of the invention will become more readily apparent from the following description of a preferred embodiment as illustrated by way of example in the accompanying drawings, in which.

DESCRIPTION OF PREFERRED EMBODIMENTS

Figures 1, 5:
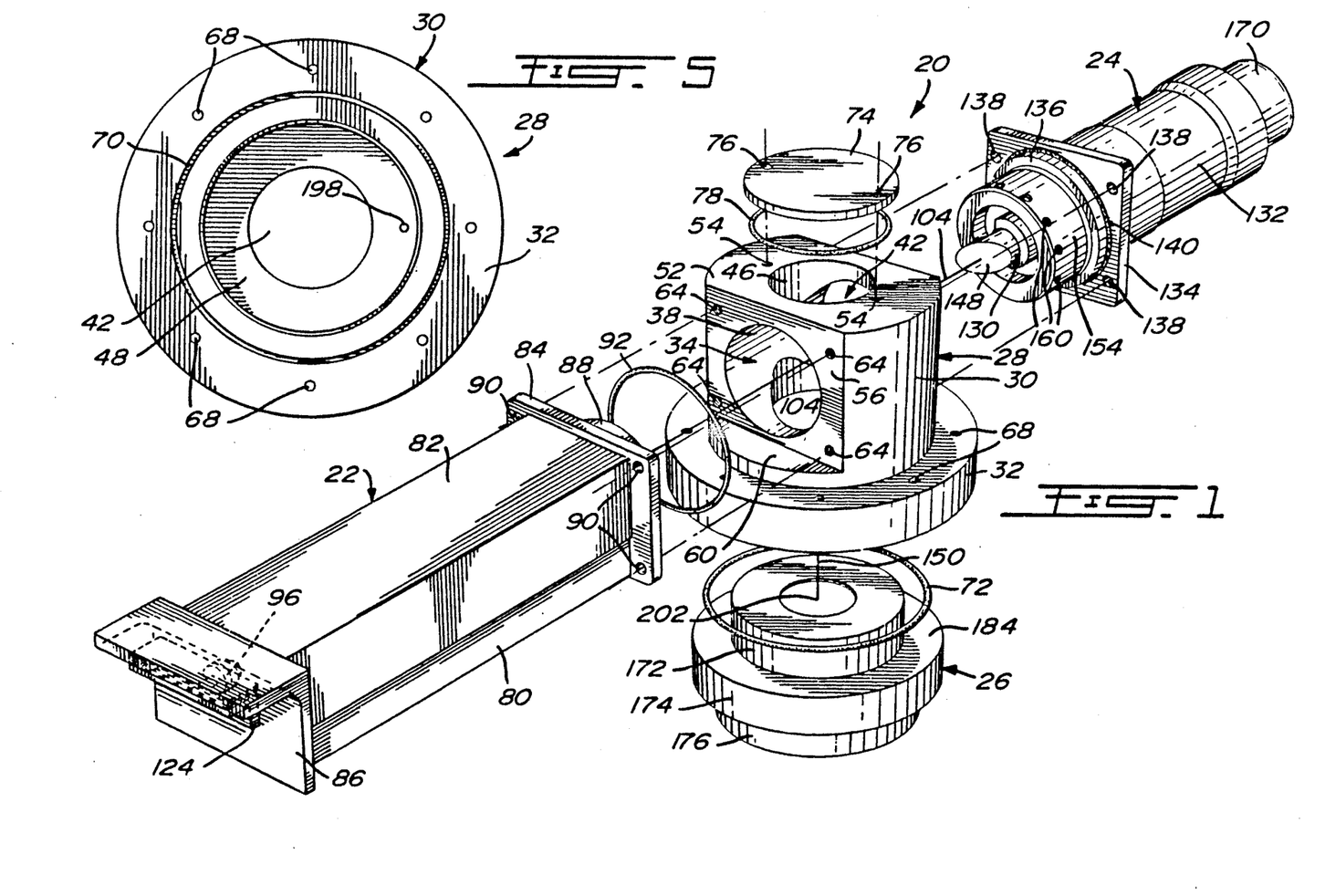
FIG. 1 is an exploded view of a laser scanning system according to a preferred embodiment of the invention.
FIG. 5 which is on the same sheet of drawings as FIG. 1 is a bottom plan view of the support shown in FIG. 2.
Figures 2, 3:
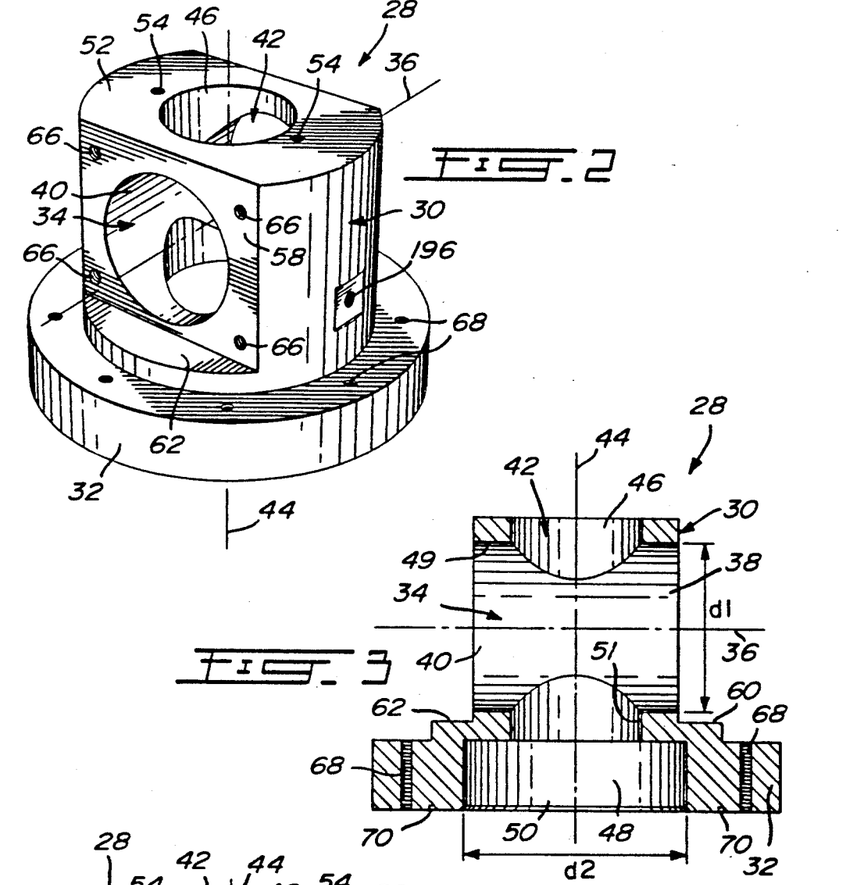
FIG. 2 is a perspective view of the support used in the scanning system illustrated in FIG. 1.
FIG. 3 is a sectional view of the support illustrated in FIG. 2.

Referring first to FIG. 1, there is illustrated a laser scanning system which is generally designated by reference numeral 20 and which comprises three main components: a laser source 22, a mirror/motor unit 24 and a scan lens 26. A support 28 is provided for mounting the three components 22, 24 and 26 at precise cooperating positions relative to one another. As best shown in FIGS. 2 and 3, the support 28 has a unitary body 30 formed with a base 32. A bore 34 having a central longitudinal axis 36 and a diameter $d_1$ extends through the body 30 as to define a pair of opposed side openings 38,40. Another bore 42 with a central longitudinal axis 44 extends through the body 30 and intersects the bore 34 orthogonally; the bore 42 defines a top opening 46 and has an enlarged section 48 of diameter $d_2$ in the base 32, thereby defining a bottom opening 50 of greater diameter than the top opening 46. The bores 34 and 42 also define in the body 30 inner surfaces 49 and 51 having fine pitch threads (not shown) for retroreflecting substantially all stray radiation.

The portion of the body 30 upstanding from the base 32 has a planar top wall 52 in which two threaded holes 54 are provided. The body 30 also has two planar sidewalls 56,58 and two side shoulders 60,62. A plurality of threaded holes 64 and 66 are defined in the sidewalls 56 and 58, respectively. The sidewalls 56 and 58 are parallel to each other and orthogonal to the axis 36 of the bore 34. The base 32, on the other hand, is provided with a plurality of spaced-apart threaded holes 68 and a circular recess 70 for receiving an 0-ring 72, as best shown in FIG. 5. A cover 74 in which are defined two holes 76 registering with the holes 54 is provided for closing the top opening 46. An 0-ring 78 is seated in a recess (not shown) formed in the cover 74 to provide a gas tight seal between the cover 74 and the top wall 52.

The laser source 22 comprises an elongated housing 80 with a cover 82, at the ends of which are provided a centrally-apertured mounting plate 84 and a L-shaped plate 86. The plate 84 which serves to mount the laser source 22 to the support 28 is provided with a collar 88 and a plurality of holes 90 registering with the holes 64 in the sidewall 56 of the support 28. The collar 88 has an outer diameter slightly less than the diameter $d_1$ of the bore 34 so as to be inserted into the side opening 38 fo tight fit reception into the bore 34, with the plate 84 engaging the sidewall 56. An O-ring 92 fits over the collar 88 to provide a gas tight seal between the plate 84 and the sidewall 56.

Figures 6, 7, 11:
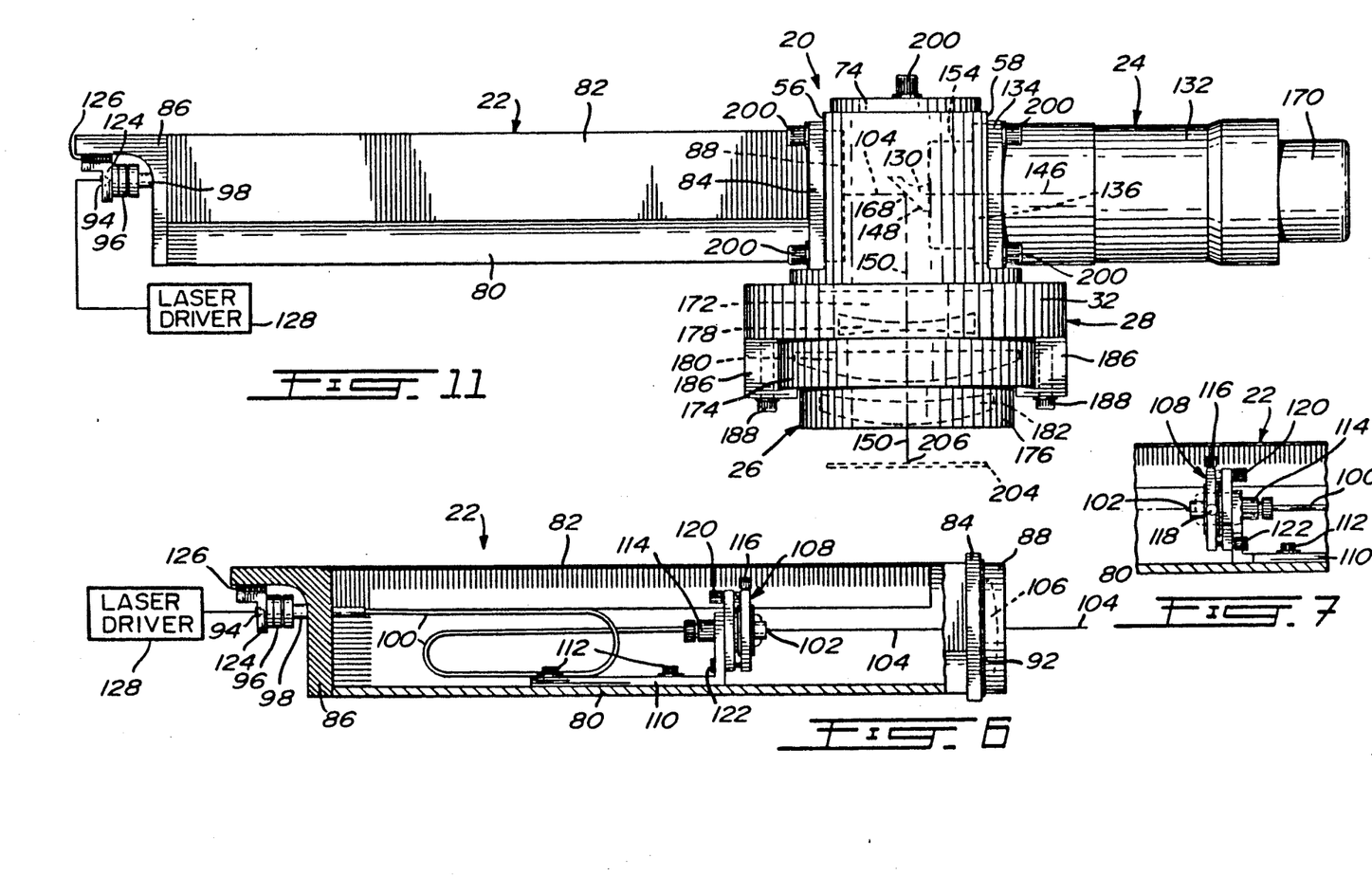
FIG. 6 is a fragmented side view of the laser source used in the scanning system of FIG. 1, shown partly in section.
FIG. 7 is a fragmented sectional view showing a detail of the laser source illustrated in FIG. 6.
FIG. 11 which is on the same sheet of drawings as FIGS. 6 and 7 is a side elevation view of the scanning system shown in FIG. 1.

As shown in FIG. 6, the laser source 22 further includes a laser diode 94 which is optically coupled by means of a coupling device 96 to the input end 98 of a single mode optical waveguide 100, for producing at the output end 102 of the waveguide 100 a laser beam 104 which is circular in cross-section, non-astigmatic and diffraction-limited and has a gaussian energy distribution. A collimating lens 106 is arranged at the front end of the housing 80 for collimating the laser beam 104. In order to position the output end 102 of the optical waveguide 100 at the focal point of the collimating lens 106, and also to properly orient the laser beam 104, an adjustable waveguide holder 108 is used to hold the output end 102. The waveguide holder 108 is mounted by means of a L-shaped bracket 110 and screws 112 to the housing 80 and includes a series of adjustment knobs 114, 116, 118, 120 and 122, as best shown in FIG. 7 which illustrates the other side of the waveguide holder 108. The adjustment knob 114 serves to move the output end 102 of the waveguide 100 towards or away from the collimating lens 106, whereas the adjustment knobs 116 and 118 serve to displace the output end 102 vertically and horizontally, respectively, in directions transverse to the displacement of the output end 102 effected by rotating the knob 114. The adjustment knobs 120 and 122, on the other hand, serve to vary the horizontal and vertical tilt angles of the output end 102 and thus to vary the angular orientation of the laser beam 104.

The laser diode 94 is mounted in a heat sink 124 to which is thermally connected a Peltier cooler 126 for maintaining the laser diode 94 at a substantially constant temperature; the Peltier cooler 126 is fixed to the plate 86. Where the laser source 22 is to be used in laser imaging, a laser driver 128 is connected to the laser diode 94 for modulating the laser beam 104 in response to an electrical signal representative of the desired image. In the embodiment illustrated, the laser beam 104 is aligned with the axis 36 of the bore 34 formed in the support 28.

Figures 8A, 8B, 9A:
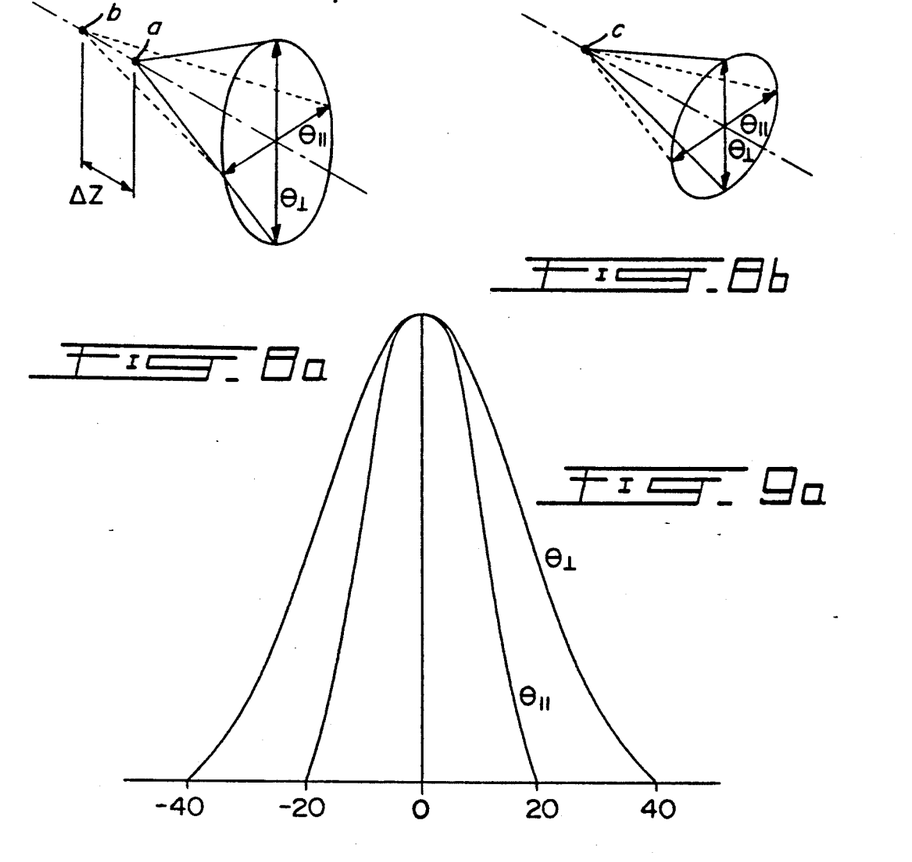
FIGS. 8a and 8b schematically illustrate the cross-sectional profile of a laser beam at the input and output ends, respectively, of a single mode optical waveguide.
FIGS. 9a and 9b graphs illustrating the far field pattern of a laser beam at the input and output ends, respectively, of a single mode optical waveguide.
Figure 9B:
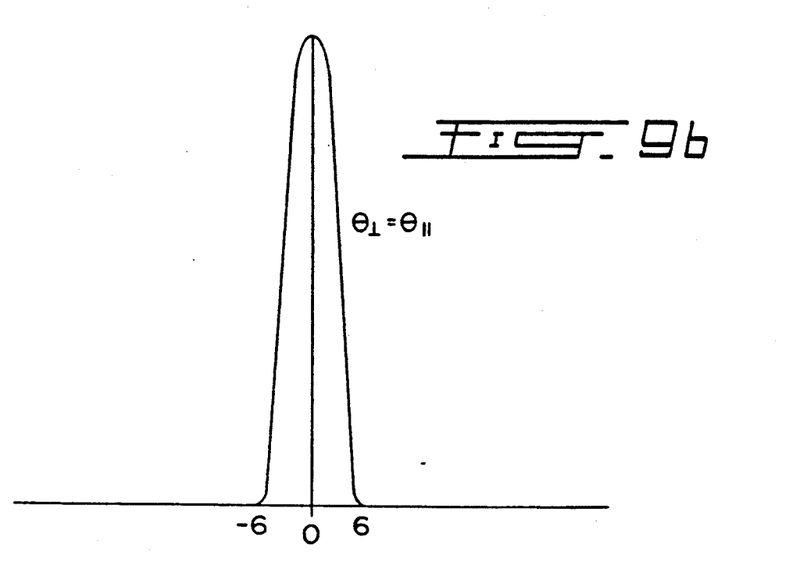

FIGS. 8a, 8b, 9a and 9b show how the astigmatism and far field pattern of a laser beam emitted from a laser diode are modified by optically coupling the laser diode to a single mode optical waveguide, such as in the embodiment illustrated in FIG. 6. As shown in FIG. 8a which illustrates the cross-sectional profile of the laser beam at the input end of the optical waveguide, the beam diverges at different tangential and sagital angles $\theta_\perp$ and $\theta_{//}$ in the two axis and is thus elleptical in cross-section. The laser beam also appears to have two different source points a and b for the perpendicular and parallel propagating directions of the beam. The astigmatic distance $\Delta Z$ is defined as the distance between the two apparent sources a and b. As it is apparent from FIG. 8b which illustrates the cross-sectional profile of the laser beam at the output end of the optical waveguide, the single mode optical waveguide acts as a spatial filter by removing the astigmatism. Thus, the beam has a single source point c for both perpendicular and parallel propagating directions of the beam; therefore $\Delta Z = 0$. The beam also has an aspect ratio of 1:1 between the tangential and sagital angles $\theta_\perp$ and $\theta_{//}$; in other words, $\theta_\perp$ 32 $\theta_{//}$ and the beam is circular in cross-section.

FIG. 9a, on the other hand, shows that the energy distribution of the beam at the input end of the optical waveguide is different for the tangential and sagital angles $\theta_\perp$ and $\theta_{//}$. As it is apparent from FIG. 9b which illustrates the far field pattern of the beam at the output end of the optical waveguide, the single mode optical waveguide corrects the energy distribution so that both tangential and sagital angles $\theta_\perp$ and $\theta_{//}$ have the same energy distribution.

The mirror/motor unit 24 comprises a rotatable beam reflector 130 which is driven at a constant speed by a motor 132, and a mounting plate 134 for mounting the unit 24 to the support 28. The plate 134 is provided with a collar 136 and a plurality of holes 138 registering with the holes 66 in the sidewall 58 of the support 28. The collar 136 has an outer diameter slightly less than the diameter $d_1$ of the bore 34 so as to be inserted into the side opening 40 for tight fit reception into the bore 34, with the plate 134 engaging the sidewall 58. An 0-ring 140 fits over the collar 136 to provide a gas tight seal between the plate 134 and the sidewall 58.

Figure 10:
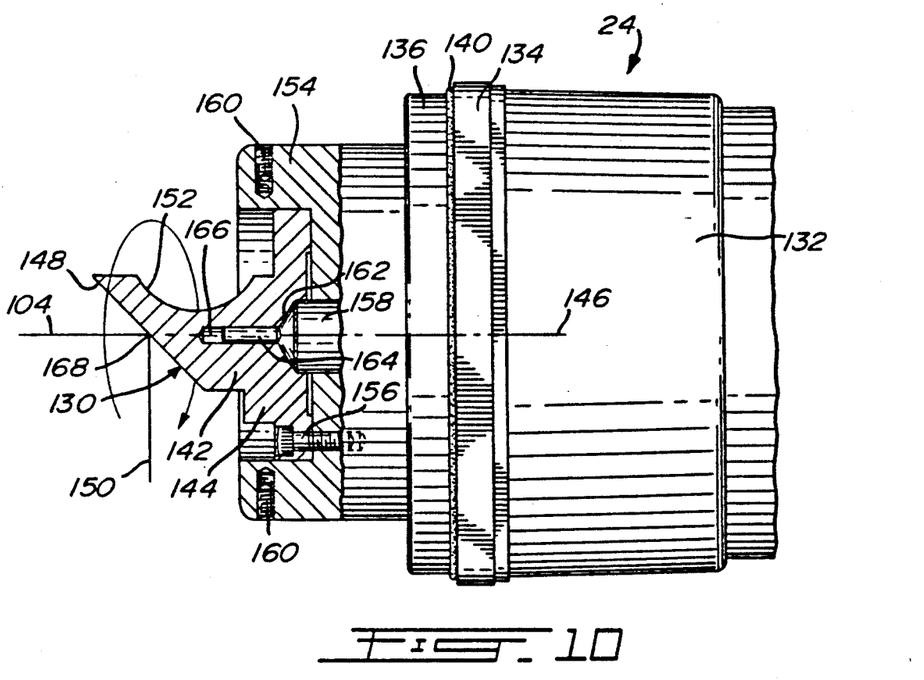
FIG. 10, is a fragmented side view of the mirror/motor unit used in the scanning system of FIG. 1, shown partly in section.

As shown in FIG. 10, the beam reflector 130 of the unit 24 comprises a cylindrical member 142 and an integral base 144. The cylindrical member 142 is truncated at an angle of 45° relative to its central longitudinal axis 146 to define a single mirror facet 148 for reflecting the laser beam 104 into a scanning beam 150 which is oriented orthogonally to the beam 104. A cavity 152 is formed in the member 142 for providing a substantially uniform mass distribution about the axis 146. The beam reflector 130 is mounted to a flywheel 154 by means of screws 156 (only one shown) extending through the base 144 and into the flywheel 154. The flywheel 154 is mounted on the output shaft 158 of the motor 132 and is provided with a plurality of circumferentially spaced-apart balancing screws 160 for removing any mass imbalance of the beam reflector 130 and flywheel 154. The output shaft 158 is coaxial with the axis 146 and has a tapered end 162 terminating in a dowel pin 164 which extends into a blind hole 166 formed in the beam reflector 130. Both the beam reflector 130 and flywheel 154 are driven by the motor 132 via the shaft 158, for rotating the truncated cylindrical member 142 about its central longitudinal axis 146 and thereby displacing the scanning beam 150 in a rotational manner at a constant velocity in a plane orthogonal to the axis of rotation 146. The mirror facet 148 thus has a center of rotation 168 lying on the rotation axis 146. In the embodiment illustrated, the rotation axis 146 of the beam reflector 130 is coaxial with the axis 36 of the bore 34 formed in the support 28; the center of rotation 168 also lies on the axis 44 of the bore 42. As shown in FIGS. 1 and 11, the mirror/motor unit 24 further includes a motor speed sensor 170 for monitoring the speed of rotation of the shaft 158.

Figure 4:
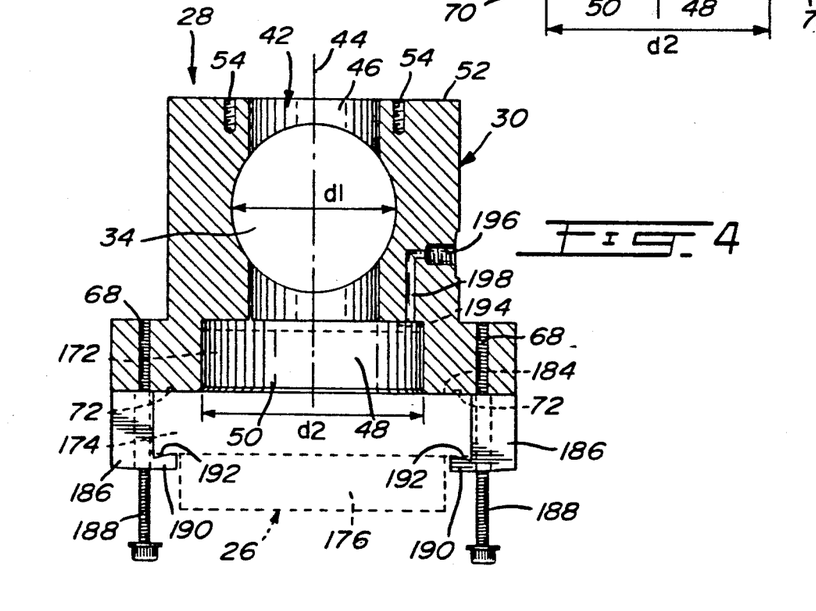
FIG. 4 is another sectional view of the support illustrated in FIG. 2, showing how the scan lens of the scanning system may be mounted thereto.

In the embodiment illustrated, the scan lens 26 is a f$\theta$ lens comprising three cylindrical sections 172, 174 and 176 of different outer diameters, in which are arranged three optical elements 178, 180 and 182, respectively, as shown in FIG. 11. The cylindrical section 174 defines an annular shoulder 184. As best shown in FIG. 4, the scan lens 26 is mounted to the support 28 by means of four L-shaped brackets 186 (only two shown) and screws 188 which extend through the brackets 186 and into the threaded holes 68 formed in the base 32 of the support 28. Each bracket 186 has a leg 190 formed with an inclined surface 192 for reducing the clamping pressure exerted by the brackets 186 onto the optical elements of the lens 26. The cylindrical section 172 of the lens 26 has an outer diameter slightly less than the diameter $d_2$ of the enlarged section 48 of the bore 42 so as to be inserted into the bottom opening 50 for tight fit reception into the bore section 48, with the annular shoulder 184 engaging the base 32. The O-ring 72 provides a gas tight seal between the annular shoulder 184 and the base 32. The lens section 172 extends partially into the bore section 48 to define an annular gap 194. As shown in FIGS. 2 and 4, the support 28 is provided with a threaded gas inlet 196 communicating with a conduit 198 which opens into the gap 194. The gas inlet 196 and conduit 198 are thus in gas flow communication with the bores 34 and 42, and serve to introduce a gas under pressure so as to maintain a positive pressure inside the body 30. Since the conduit 198 opens into the gap 194 and not into the bore 34, such an arrangement maintains the integrity of the retroreflective surface 49 of the bore 34.

FIG. 11 illustrates how the laser source 22 and the mirror/motor unit 24 are mounted to the support 28 and secured thereto by means of screws 200. The laser source 22 and the mirror/motor unit 24 are thus positioned such that the laser beam 104 is aligned with the rotation axis 146 of the beam reflector 130. The scan lens 26 which is secured to the support 28 by means of the brackets 186 and screws 188 is positioned such that the center of rotation 168 of the mirror facet 148 is aligned with a center point 202 (shown in FIG. 1) of the lens 26. The laser source 22, mirror/motor unit 24 and scan lens 26 can therefore be replaced without any need for re-alignment. The scan lens 26 is adapted to focus the scanning beam 150 onto a material 204 such as a sheet film, and to provide a focused beam spot 206 moving repeatedly in a linear direction across the material 204. The interior of the support 28 can be visually inspected and the mirror facet 148 cleaned via the top opening 46 by removing the screws 200 and cover 74.

Figure 12:
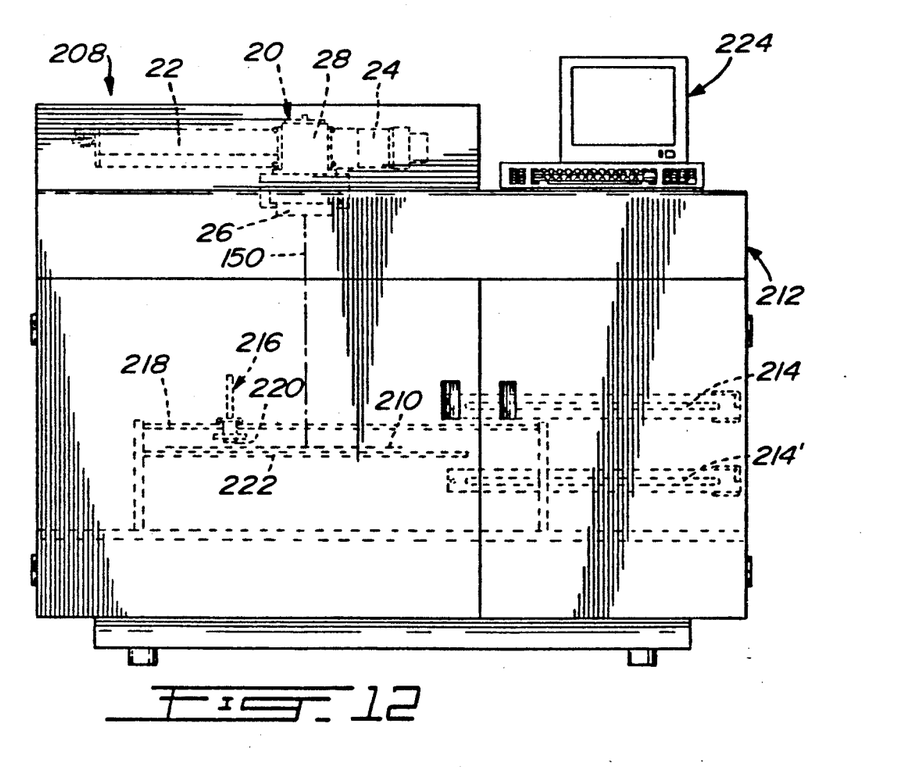
FIG. 12 is a front elevation view of a laser imaging the laser scanning system shown in FIG. 1.

FIG. 12 illustrates how the laser scanning system 20 may be installed in a laser imaging apparatus 208 for producing a two-dimensional image on a sheet film 210. The apparatus 208 comprises a housing 212 in which are arranged two sheet film cartridges 214 and 214', a film transport mechanism 216 (partially shown) moving along guide rails 218 (only one shown) and including a suction disk 220, and a flat vacuum bed 222 mounted on a linear translation stage (not shown), the laser scanning system 20 being arranged at the top of the apparatus. The film cartridges 214 and 214' are mounted on an elevator system (not shown) for vertical displacement; the cartridge 214 is used to load unexposed sheet films whereas the cartridge 214' serves to unload the films after exposure. The apparatus 208 is operated by means of a micro-computer 224.

When laser imaging is initiated, the cartridge 214 is moved into a position closely adjacent the flat vacuum bed 222 and the suction disk 220 picks up a film 210 from the cartridge 214 and positions it on the flat vacuum bed 222. The film 210 is scanned by the scanning beam 150. As the beam 150 moves across the film 210, it is modulated in response to an electrical signal which is fed to the scanning system 20 and which is representative of the desired image, thereby providing a first dimension of the image on the film 210. The flat vacuum bed 222 with the film 210 thereon is then moved by the linear translation stage and the film 210 is scanned again by the beam 150, thereby providing the other dimension of the desired two-dimensional image. This process is repeated until the complete image is scanned.

When imaging is complete, the cartridge 214' is moved into a position closely adjacent the flat vacuum bed 222, the exposed film 210 is picked up from the flat vacuum bed 222 by the suction disk 220 and inserted into the cartridge 214'. This sequence can be repeated automatically until the cartridge 214 requires a refill.

We claim:

1. A method of generating a collimated laser beam which is circular in cross-section, non-astigmatic, diffraction-limited and has a gaussian energy distribution, which comprises providing a single mode optical waveguide having an input end and an output end, disposing a collimating lens in spaced relationship to the output end of said optical waveguide such that said output end is positioned at a focal point of said collimating lens, optically coupling a laser diode to the input end of said optical waveguide, energizing said laser diode to produce at the output end of said optical waveguide a laser beam which is circular in cross-section, non-astigmatic, diffraction-limited and has a gaussian energy distribution, and directing said laser beam through said collimating lens to collimate same.

2. A method as claimed in claim 1, wherein said laser diode is a red laser diode.

3. A device for generating a collimated laser beam which is circular in cross-section, non-astigmatic, diffraction-limited and has a gaussian energy distribution, comprising a single mode optical waveguide having an input end and an output end, a laser diode optically coupled to the input end of said optical waveguide for producing at the output end thereof a laser beam which is circular in cross-section, non-astigmatic and diffraction-limited and has a gaussian energy distribution, and a collimating lens for collimating said laser beam, said collimating lens having a focal point and being disposed in spaced relationship to the output end of said optical waveguide such that said output end is positioned at the focal point of said collimating lens.

4. A device as claimed in claim 3, wherein said laser diode is a red laser diode.

5. A device as claimed in claim 3, further including adjustable waveguide holding means for adjustably positioning and orienting said output end of said optical waveguide.

6. A device as claimed in claim 3, further including means for maintaining said laser diode at a substantially constant temperature.

7. A device as claimed in claim 6, wherein said laser diode is mounted in a heat sink and wherein said means for maintaining said laser diode at a substantially constant temperature comprises a Peltier cooler which is thermally connected to said heat sink.

8. A device as claimed in claim 3, further including laser drive means electrically connected to said laser diode for modulating said laser beam in response to an electrical signal.

* * * * *